United States Patent [19]

Stone et al.

[11] Patent Number: 5,684,896
[45] Date of Patent: Nov. 4, 1997

[54] DATA COMPRESSION

[75] Inventors: Jonathan James Stone, Reading; Rajan Bhandari, Basingstoke; Michael John Ludgate, Basingstoke; Terence Ralph Hurley, Newbury, all of England

[73] Assignees: Sony Corporation, Tokyo, Japan; Sony United Kingdom Limited, Weybridge, United Kingdom

[21] Appl. No.: 263,260

[22] Filed: Jun. 21, 1994

Related U.S. Application Data

[63] Continuation of Ser. No. 912,265, Jul. 13, 1992, abandoned.

[30] Foreign Application Priority Data

Sep. 19, 1991 [GB] United Kingdom ............... 9119985

[51] Int. Cl.⁶ .................................................. G06T 9/00
[52] U.S. Cl. ...................... 382/239; 382/248; 382/251; 358/430; 358/433
[58] Field of Search ........................ 382/239, 248, 382/250, 251; 358/430, 432, 433; 348/405, 420, 419

[56] References Cited

U.S. PATENT DOCUMENTS

| | | | |
|---|---|---|---|
| 4,125,873 | 11/1978 | Chesarek | 345/202 |
| 4,302,775 | 11/1981 | Widergren et al. | 358/136 |
| 4,775,893 | 10/1988 | Ishikawa | 358/431 |
| 4,969,040 | 11/1990 | Gharavi | 358/136 |
| 4,999,705 | 3/1991 | Puri | 358/136 |
| 5,073,820 | 12/1991 | Nakagawa et al. | 348/405 |
| 5,073,821 | 12/1991 | Juri | 358/135 |
| 5,126,857 | 6/1992 | Watanabe et al. | 358/432 |
| 5,146,324 | 9/1992 | Miller et al. | 358/133 |
| 5,184,229 | 2/1993 | Saito et al. | 358/427 |
| 5,196,933 | 3/1993 | Henot | 358/133 |

FOREIGN PATENT DOCUMENTS 0 399 487  11/1990  European Pat. Off. .

OTHER PUBLICATIONS

Ngan, et al. "Adaptive Cosine Transform Coding of Images in perceptual Domain" IEEE. Trans. Acoustics, Speech and Sig. Proc. vol.: 37, Iss:11, pp. 1743-1750, Nov. 1989.

WH Chen & WK Pratt, IEEE Trans. Comm., vol. COM-32 (3), Mar. 1984, pp. 225-232.

*Primary Examiner*—Michael T. Razavi
*Assistant Examiner*—Jon Chang
*Attorney, Agent, or Firm*—William S. Frommer; Alvin Sinderbrand

[57] ABSTRACT

A data compression apparatus is described which applies a dynamically variable degree of quantisation $Q_s$ to input data so as to control blocks of output data to have a predetermined maximum size. The dynamic control can be carried out on an inter-block basis or an intra-block basis. An overflow detector is provided for inserting an overflow indicator within blocks of compressed data to indicate when overflow has occurred.

7 Claims, 12 Drawing Sheets

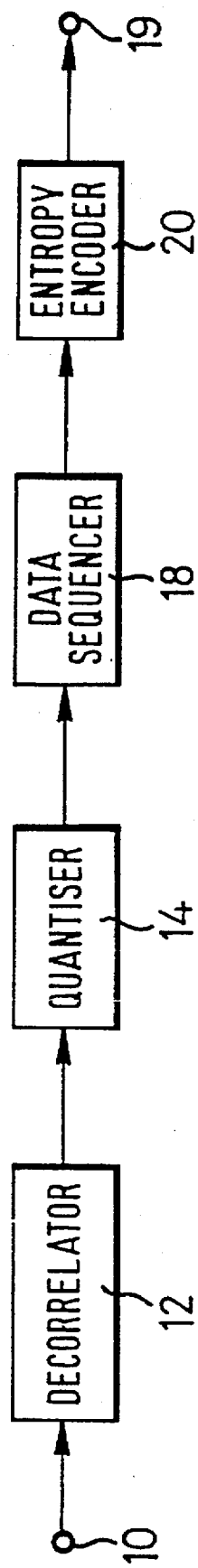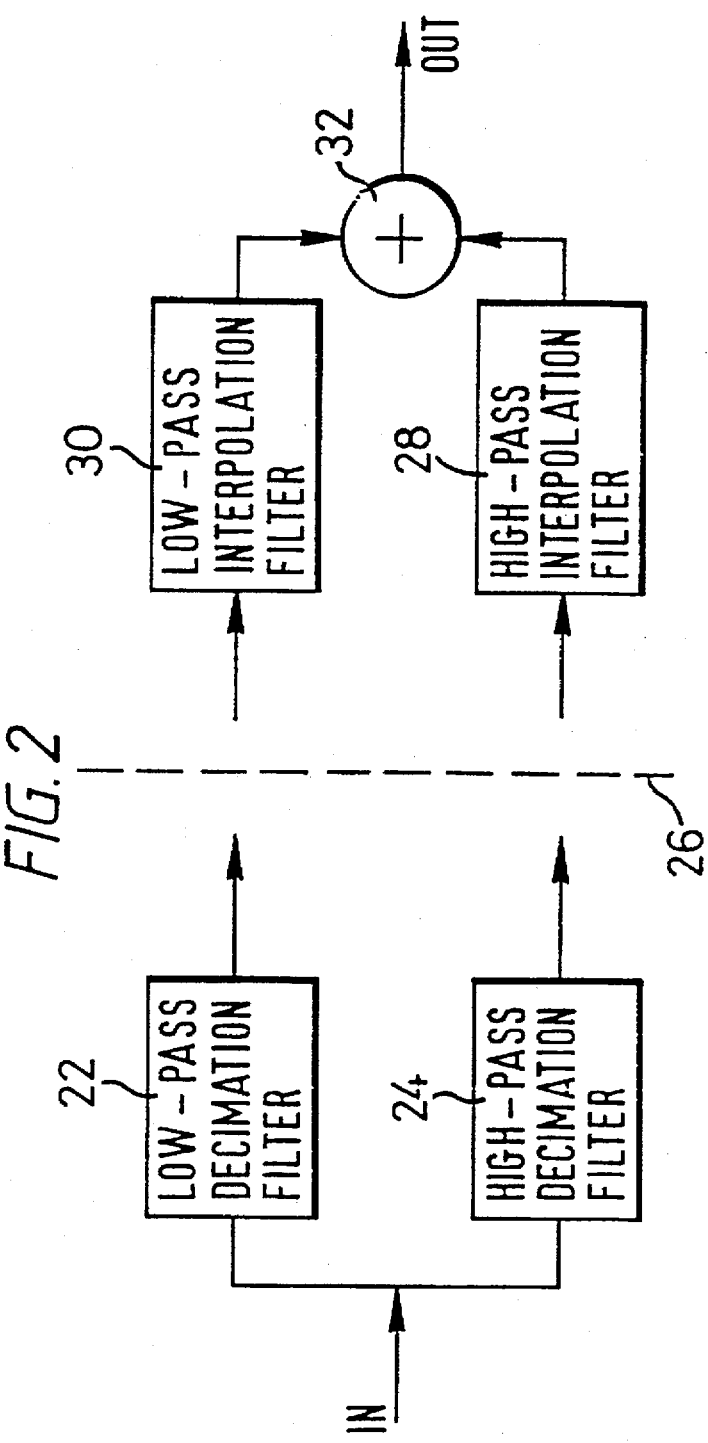

| 68 | 64 | 84 | 127 | 208 | 358 | 638 | 1163 |
|---|---|---|---|---|---|---|---|
| 64 | 72 | 96 | 144 | 233 | 396 | 697 | 1260 |
| 84 | 96 | 126 | 184 | 290 | 481 | 831 | 1475 |
| 127 | 144 | 184 | 260 | 396 | 637 | 1069 | 1856 |
| 208 | 233 | 290 | 396 | 581 | 904 | 1474 | 2491 |
| 358 | 396 | 481 | 637 | 904 | 1362 | 2153 | 3537 |
| 638 | 697 | 831 | 1069 | 1474 | 2153 | 3301 | 5272 |
| 1163 | 1260 | 1475 | 68 | 68 | 3537 | 5272 | 8192 |

|  | 2 | 5 | 10 | 16 | 23 | 34 | 44 |
|---|---|---|---|---|---|---|---|
| 1 | 3 | 7 | 12 | 18 | 27 | 36 | 46 |
| 4 | 6 | 8 | 14 | 21 | 29 | 38 | 51 |
| 9 | 11 | 13 | 19 | 26 | 32 | 42 | 52 |
| 15 | 17 | 20 | 25 | 30 | 40 | 49 | 55 |
| 22 | 24 | 28 | 31 | 39 | 47 | 54 | 58 |
| 33 | 35 | 37 | 41 | 48 | 53 | 56 | 60 |
| 43 | 45 | 50 |  |  | 57 | 59 | 61 |

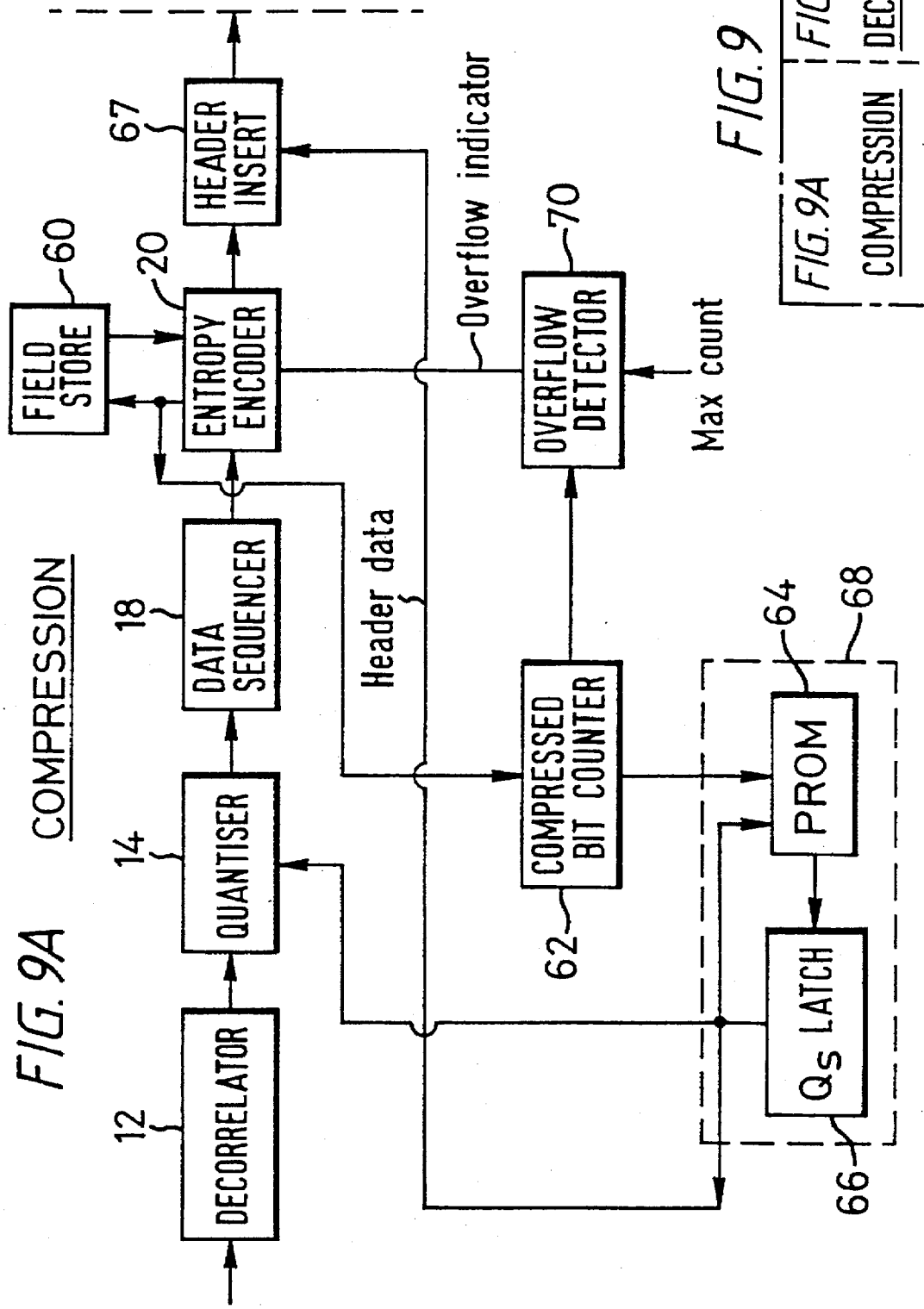

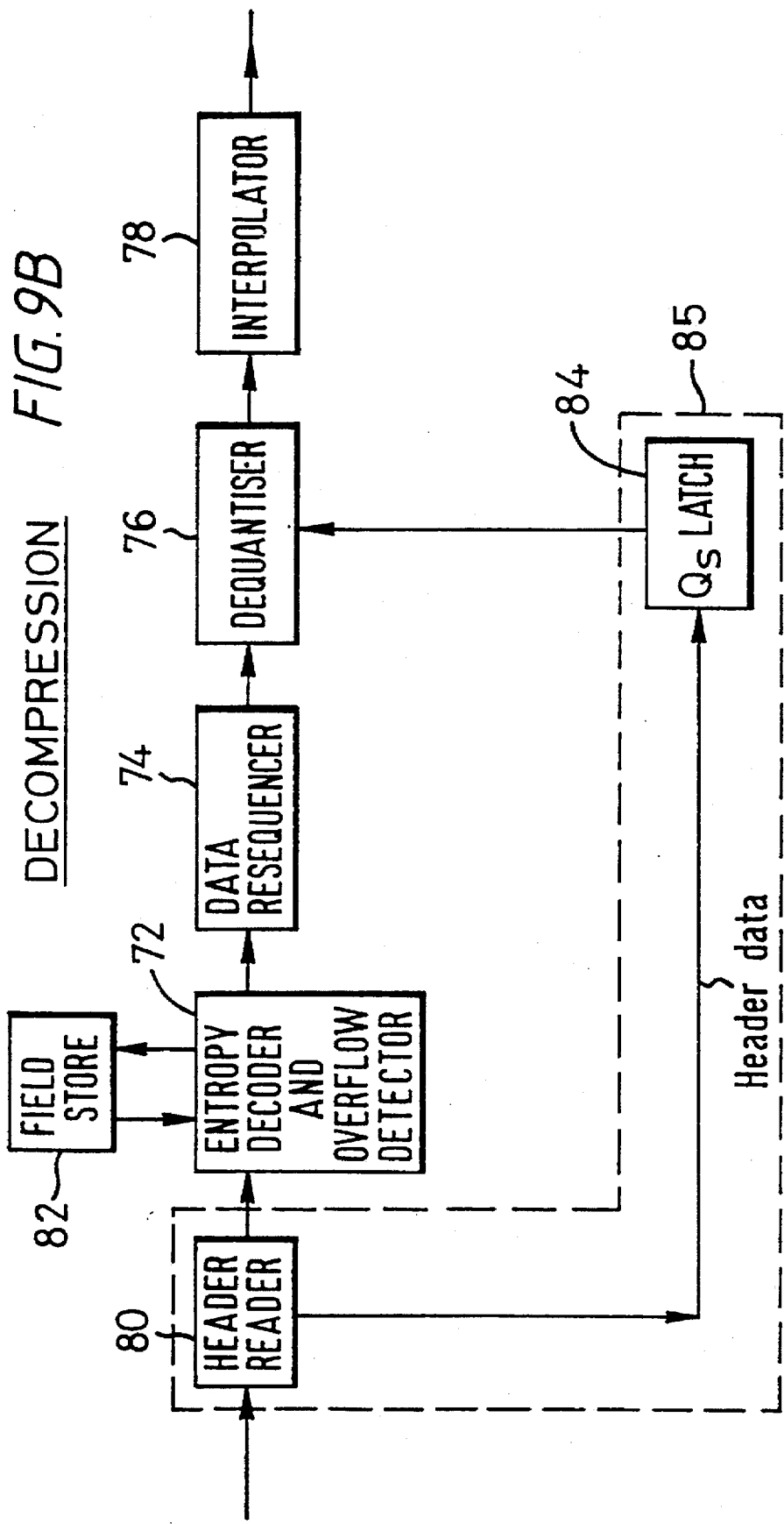

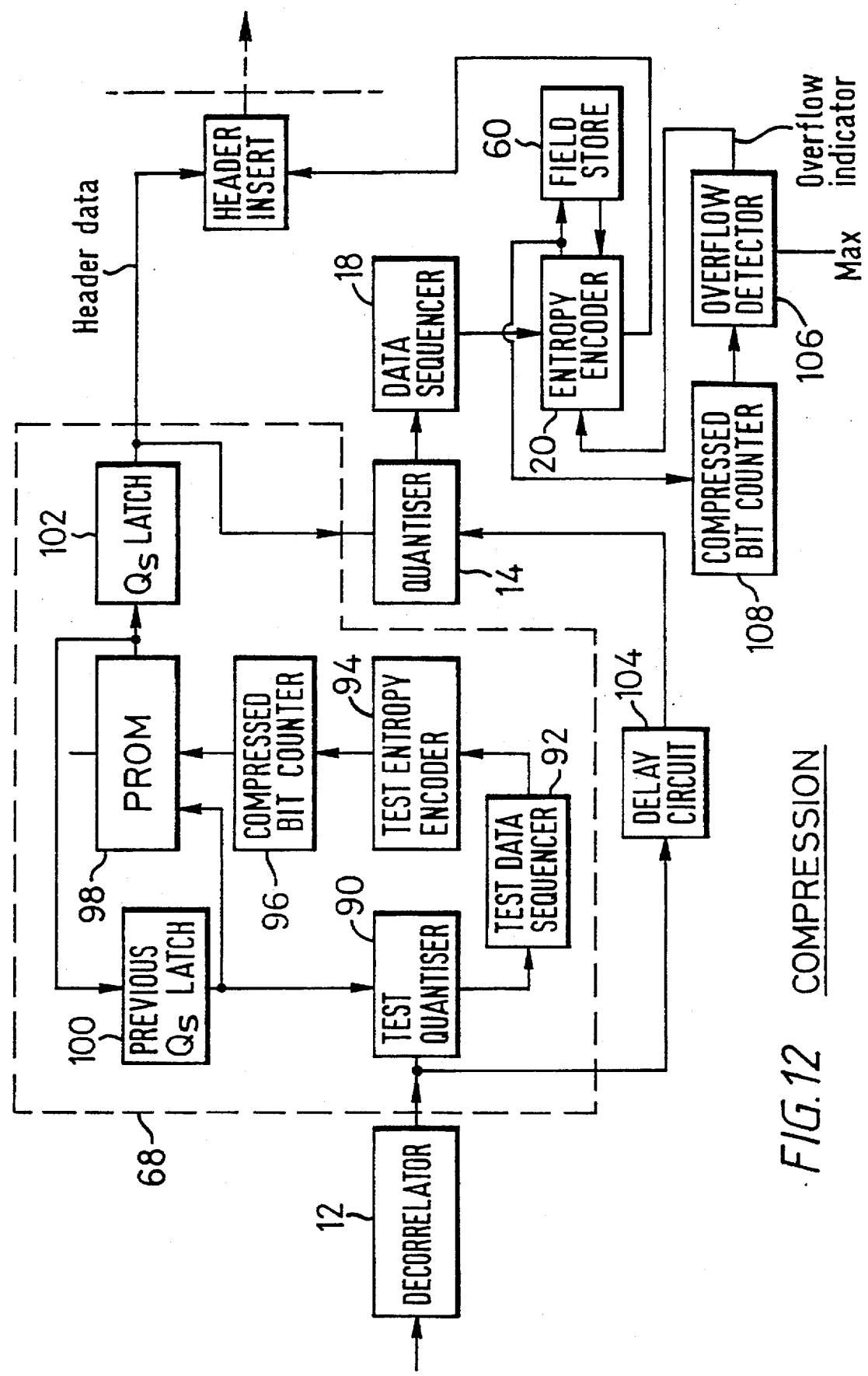
FIG. 12  COMPRESSION

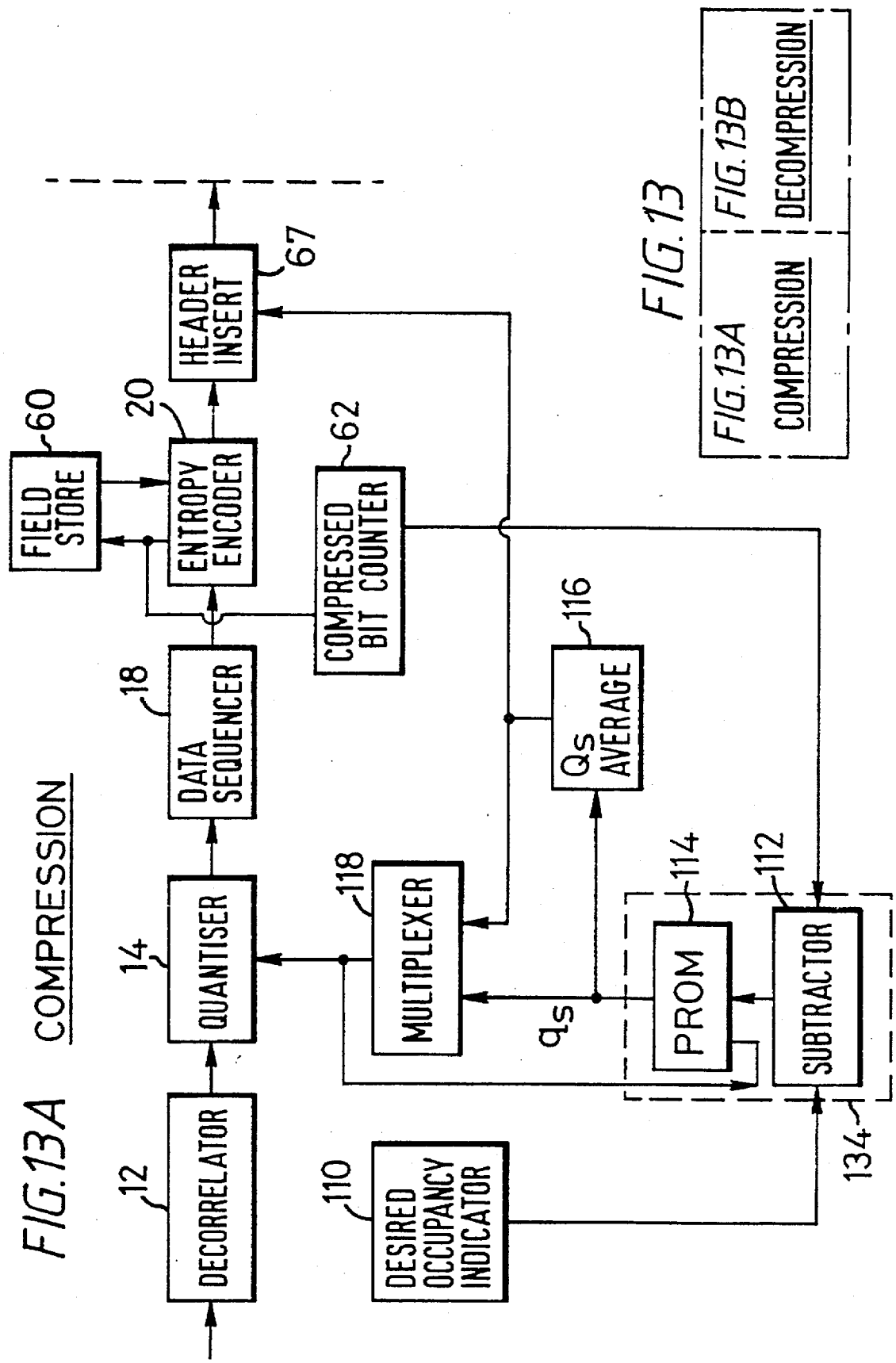

DATA COMPRESSION

This application is a continuation of application Ser. No. 07/912,265, filed Jul. 13, 1992, now abandoned.

BACKGROUND OF THE INVENTION

1. Field of the Invention

This invention relates to the field of data compression. More particularly, this invention relates to the field of data compression of the type in which blocks of input data are compressed into blocks of compressed data having a predetermined maximum size.

2. Description of the Prior Art

In some known data compression systems a quantiser is used to selectively remove information from the data as part of the compression process. A higher degree of quantisation will produce a higher degree of compression. In general, it is not possible to determine in advance what degree of compression will be produced by a particular degree of quantisation, since different portions of the input data may vary in information content and suitability for compression.

In some systems this is not a problem. For example, in the data compression system proposed by the Joint Photographic Experts Group currently under review by the International Standards Organisation image data is compressed using a quantiser and entropy encoder to a degree that varies upon the particular image and parameters used. The compressed image data is intended for non-real time processing and display, and accordingly, variations in the degree of compression achieved do not cause particular problems.

In another known data compression system input data is compressed with a quantiser and entropy encoder to effect temporal compression for the purpose of serial transmission. A data buffer is used to provide some time averaging of the degree of compression achieved. Compressed data is both continuously added to and removed from the buffer. If the buffer becomes too empty, or too full, then the degree of quantisation applied by the quantiser is changed to change the average rate of data flow into the buffer.

In contrast to the above, the problem of variation in the degree of compression achieved is particularly serious when compressing input data into blocks of a predetermined maximum size. The predetermined maximum size of the blocks of compressed data may be the result of the need to store each block of compressed data on magnetic tracks of fixed maximum capacity or the need to use the block of compressed data in a real-time transmission system with fixed maximum times for the processing of each block of compressed data. In such situations there is no flexibility in the maximum size of blocks of compressed data that can be accommodated. If too much compressed data is produced to fit into the fixed size block then an overrun with a consequential uncontrolled loss of data will occur.

To guard against this, the system can be set to have a degree of quantisation sufficient to ensure that all but the most information dense and difficult blocks of input data will compress to within the fixed size blocks.

Whilst the above solution is safe, it has the disadvantage that for most blocks of input data too high a level of quantisation is applied and more information is lost from the block of input data than was in fact necessary to fit the compressed data into its fixed size.

It is an object of the invention to provide the degree of compression for fixed size blocks necessary for a given use with as low a loss in information from the input signal as is possible.

SUMMARY OF THE INVENTION

Viewed from one aspect the invention provides a data compression apparatus for compressing blocks of input data into blocks of compressed data having a predetermined maximum size, said data compression apparatus comprising:
a quantiser for applying a dynamically variable degree of quantisation to said blocks of input data to control the size of said blocks of compressed data to be substantially equal to said predetermined maximum size.

The invention recognises that the variation in the degree of compression achieved with blocks of input data in general undergoes relatively small changes between adjacent blocks. For example, if the blocks of input data are successive fields of a video picture, then the changes in the scene depicted by the video field, and the information content of the video field, are relatively slow. In many other applications there are also relatively slowly changing information contents between blocks. Observation of different data streams will frequently show long runs of data sharing either high or low information content, e.g. long runs of zeros or low values followed by bursts of values of high information content. The invention not only recognises this property but exploits it by the application of dynamic control to the degree, of quantisation applied to the input data.

It might have been thought that the finite response time of the dynamic control system would cause frequent losses of data through overrunning the predetermined maximum size of the blocks of compressed data. In fact, the relatively slow changes in information content between blocks of input data mean that the finite response time of the dynamic control system does not cause significant problems except in cases of very sudden changes from low to high information content, e.g. edit scene changes in a video picture. Dynamic control of the degree of quantisation reduces the average amount of information lost from the input data due to compression whilst guarding against overruns in the sizes of the blocks of compressed data.

An advantageously simple way to monitor the degree of compression achieved by a particular degree of quantisation is to provide a compressed bit counter for storing a count of bits within blocks of compressed data.

The dynamic control of the degree of quantisation could be performed in a number of different ways, with varying degrees of sophistication. However, a simple yet effective control can be provided with an inter-block quantisation controller responsive to said compressed bit counter for determining at the end of compression of a block of input data what degree of quantisation said quantiser should apply to said block of input data to control the size of said block of compressed data to be substantially equal to said predetermined maximum size.

The relationship between the degree of quantisation and the degree of compression is not a simple one and varies significantly on a number of factors including the information content of the block of input data being compressed.

A simple system which copes with this relationship is one in which said inter-block quantisation controller determines a difference value between said count of bits stored by said compressed bit counter and said predetermined maximum size and uses said difference to reference a memory storing data mapping difference values to corresponding changes in degree of quantisation for reducing each said difference value to substantially zero.

A more sophisticated system for dealing with this relationship is one in which said inter-block quantisation controller uses said count of bits stored by said compressed bit counter and a value indicating the current degree of quantisation to reference from within a memory one of a plurality of sets of data mapping degree of quantisation against degree of compression and reads from said set of data what degree of quantisation said quantiser should apply to said block of input data to control the size of said block of compressed data to be substantially equal to said predetermined maximum size.

In simpler embodiments of the invention said degree of quantisation determined by said inter-block quantisation controller is fed back to said quantiser for application to a subsequent block of input data.

In situations where a mope exact inter-block control is required and in which time delay is not a critical problem said inter-block quantisation controller further comprises a test quantiser for applying a test degree of quantisation to each block of input data, said compressed bit counter being arranged to measure the degree of compression achieved with said test degree of quantisation, and a delay circuit for delaying arrival of said block of input data at said quantiser until said degree of quantisation determined by said inter-block quantisation controller is available for application by said quantiser to said block of input data.

Given that in accordance with the invention the quantiser applies a varying degree of quantisation to the blocks of input data, it is apparent that a varying degree of dequantisation must subsequently be applied to the blocks of compressed data during decompression. Accordingly, preferred embodiments of the invention provide an effective way of achieving this by including means for writing header information into said blocks of compressed data indicating what degree of quantisation has been applied to said blocks of compressed data by said quantiser under control of said inter-block quantisation controller.

In the above, control has been carried out upon an inter-block basis. In preferred embodiments, the risk of overrun occurring can be further reduced by providing a desired occupancy indicator for providing an indication of the number of bits quantised in each block of input data and an intra-block quantisation controller responsive to said desired occupancy indicator and said compressed bit counter for determining what degree of quantisation said quantiser should apply to subsequent bits within said block of input data to control the size of said blocks of compressed data to be substantially equal to said predetermined maximum size, and wherein said quantiser applies said degree of quantisation determined by said intra-block quantisation controller to said subsequent bits within said block of input data.

The intra-block quantisation controller can be used in conjunction with one of the previously described inter-block quantisation controllers. However, a more straightforward approach is to provide an embodiment further comprising an accumulator storing a value indicative of the average degree of quantisation applied to a current block of input data, and a latch for reading said accumulator at the end of compression of each block of input data and serving as source of a base degree of quantisation to be applied to a subsequent block of input data.

If, despite the best efforts of the dynamic control, an overrun does occur, then the consequences can be controlled by provision of an overflow detector for detecting when a block of compressed data exceeds said predetermined maximum size and appending an overflow indicator to said block of compressed data.

Whilst dynamic control systems usually operate well, when a rapid change in information content occurs between blocks of image data (e.g. an edit change of scene) then the finite response time of the dynamic control results in a temporary overflow in data. This is a particular problem with inter-block control. Although the system will eventually recover to an appropriate degree of quantisation, there will, at least temporarily, be an uncontrolled loss of data. With intra-block control the system is able to react to the change of information content during compression of the first block after the change and so the problem of overflows is less severe.

The overflow detector reduces this problem by monitoring to detect overflows and appending a code indicating this occurrence to the end of the block of compressed data. In itself this doesn't reduce the amount of data lost, but it does allow the system which subsequently decompresses the blocks of compressed data to recognise what has happened and carry out an appropriate controlled recovery procedure.

It will be appreciated that the invention is applicable to different sorts of data compression systems. However, the invention is particularly suited to embodiments in which said data compression apparatus is operable with input data which is image input data. As noted above the variation of information content between adjacent blocks of input data is relatively small making dynamic control of the level of quantisation particularly effective.

Again, the invention is applicable to different sorts of image input data compression systems, but is particularly suited to embodiments further comprising a decorrelator for frequency separating said image input data in the two-dimensional spatial frequency domain into frequency component data. The frequency separation may be carried out using techniques such as discrete cosine transformation of sub band filtering. In such embodiments the relationship between the compressed data and the image data is complex, with certain portions of the compressed data having a particularly large influence upon the quality of image that can be reproduced. In these circumstances it is particularly important to control any losses of data due to overrun that may occur.

A degree of control over what data is lost on overrun can be provided by a data sequencer for controlling the order of data within said compressed blocks.

In particular, preferred embodiments may be provided in which said data sequencer controls the order of data within said compressed blocks so that dc luminance data appears before ac luminance data.

In addition, preferred embodiments may also be provided in which said data sequencer controls the order of data within said compressed blocks so that dc chrominance data appears before ac luminance data.

The dc luminance and dc chrominance data is critical to the quality of image that can be reproduced and so placing this data towards the start of each block of compressed data will reduce the likelihood of its loss on overrun.

A further refinement of the invention provides that said data sequencer controls the order of data within said compressed blocks so that ac frequency component data appears in order of increasing frequency. This recognises that the importance to image quality of ac frequency component data decreases as frequency increases. Accordingly, the least important data is that placed at the end of the blocks of compressed data where it will be lost first in overrun.

Preferred embodiments of the invention which provide high degree of compression combined with an advantageous simple implementation of the invention are those further comprising an entropy encoder for compressing data from said quantiser and wherein said overflow indicator is a code not used by said entropy encoder to encode image data.

Viewed from another aspect the invention provides a data compression method for compressing blocks of input data into blocks of compressed data having a predetermined maximum size, said data compression method comprising the step of:

applying a dynamically variable degree of quantisation to said blocks of input data to control the size of said blocks of compressed data to be substantially equal to said predetermined maximum size.

A complementary aspect of the invention is the provision of a data decompression apparatus for decompressing blocks of compressed data having a predetermined maximum size into blocks of output data, said decompression apparatus comprising:

(i) an inter-block dequantisation controller for reading from said blocks of compressed data header information indicating what degree of quantisation was applied to said blocks of compressed data; and (ii) a dequantiser for applying a dynamically variable degree of dequantisation to said blocks of compressed data in response to said read header information.

It will also be appreciated that the features of the invention discussed above also carry through to a data signal processed by the apparatus or method of the invention. These image data signals bear features imposed upon them by the data compression apparatus and method of the present invention.

The above, and other objects, features and advantages of this invention will be apparent from the following detailed description of illustrative embodiments which is to be read in connection with the accompanying drawings.

BRIEF DESCRIPTION OF THE DRAWINGS

FIG. 1 is a schematic illustration of a data compression system;

FIG. 2 is a schematic illustration of a simple sub band coding system;

FIG. 7 is a quantisation matrix;

FIG. 8 illustrates the order of intra-sub band scanning of the ac spatial frequency components.

FIG. 9 comprising FIGS. 9A and 9B shows a data compression apparatus and a data decompression apparatus with dynamic control of the degree of quantisation calculated on an inter-block basis;

FIG. 12 illustrates another form of data compression apparatus for carrying out inter-block dynamic control of the degree of quantisation;

FIGS. 13A and 13B illustrate a data compression apparatus and a data decompression apparatus for effecting both inter-block and intra-block dynamic control of the degree of quantisation.

DESCRIPTION OF THE PREFERRED EMBODIMENTS

Figure 3:
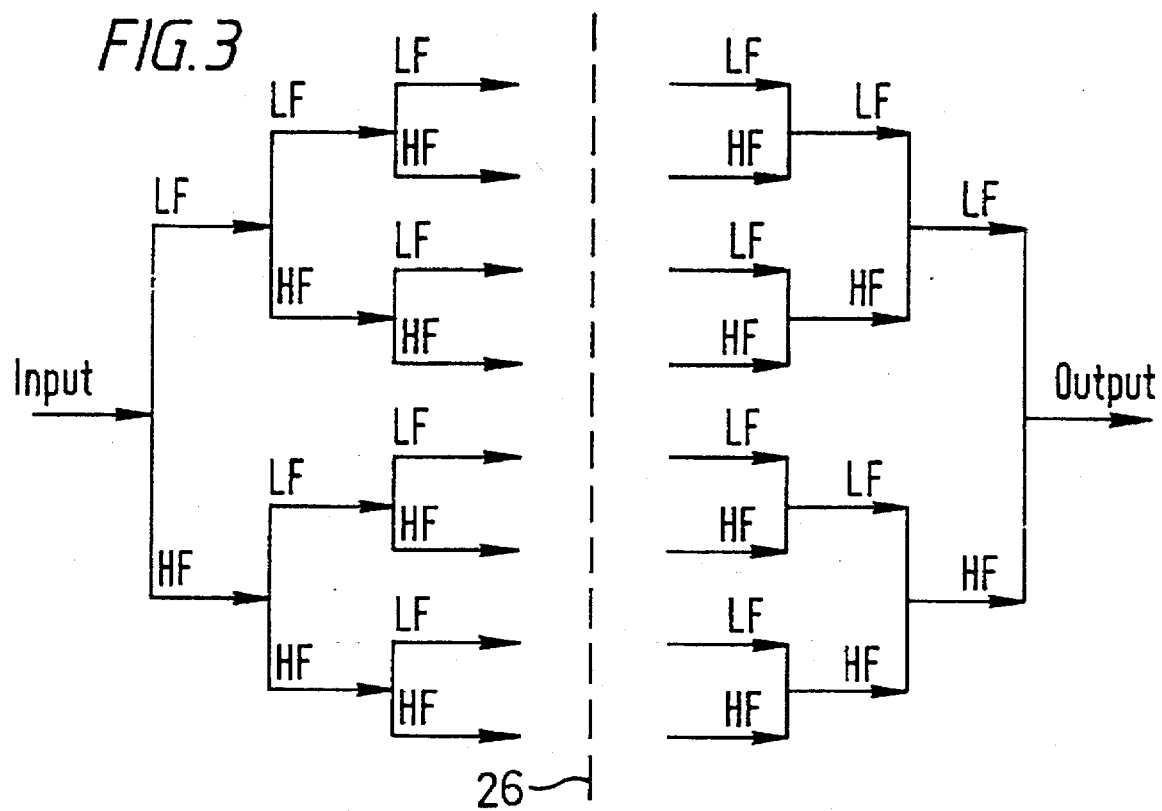
FIG. 3 is a schematic illustration of a higher order sub band coding system.

FIG. 1 shows an apparatus for effecting intra-image frequency separation and compression of a video signal in the two-dimensional spatial frequency domain. A video signal, which is in digital form and comprises successive multi-bit (for example 8-bit) samples or words each representing a respective pixel of a scanned image or picture, is applied via an input 10 to a decorrelator 12. A frequency separated video signal is fed by the decorrelator 12 to a quantiser 14 and then via a data sequencer 18 to an entropy encoder 20, which together compress the frequency separated video signal provided by the decorrelator 12 to produce a compressed signal on an output 19. The compressed signal can then be transmitted or stored. After transmission or storage, the compressed signal can be restored substantially to its original form by expansion by way of entropy decoding, resequencing, dequantising and correlation operations which employ parameters converse to those used for decorrelation, sequencing, quantisation and entropy encoding, respectively, upon compression.

The operation of decorrelation performed in the decorrelator 12 relies upon the fact that neighbouring pixels of an image are highly correlated, whereby processing an image (for example, a field or frame of a video signal) to form frequency separated signal portions representing different components of the image in the two-dimensional spatial frequency domain enables a reduction in the amount of information needed to represent the image. Specifically, the frequency separated signal portions represent different spatial frequency components of the image.

The sequencing operation will be described in more detail below.

The quantisation operation, which is a lossy operation, in that it involves deliberate discarding of some frequency data considered to be redundant or of little importance to adequate perception of the image by the human psychovisual system, in itself enables some signal compression to be achieved. The quantiser 14 enables compression to be achieved in two ways: it reduces the number of levels to which the data inputted to it can be assigned, and it increases the probability of runs of zero value samples on the data it outputs. The ability to achieve enhanced signal compression provided by the operation of the quantiser is carried into effect in the entropy encoder 20 in that the reduction in information content achieved in the quantiser 14 enables a consequential bit (data) rate reduction to be achieved in the entropy encoder.

Further (non-lossy) compression, and bit (data) rate reduction, is provided in the entropy encoder 20 in which, in known manner, using for example variable length coding, the data produced by the quantiser 14 is encoded in such a manner that more probable (more frequently occurring) items of data produce shorter output bit sequences than less probable (less frequently occurring) ones. In this regard, the decorrelation operation has the effect of changing the probability distribution of the occurrence of any particular signal level, which is substantially the same as between the different possible levels before decorrelation, into a form in which it is much more probable that certain levels will occur than others.

The compression/coding system or apparatus as shown in FIG. 1 can be embodied in a variety of ways, using different forms of decorrelation. An increasingly popular form of implementation makes use of so-called transform coding, and in particular the form of transform known as the discrete cosine transform. The use of discrete cosine transformation for decorrelation is in fact prescribed in a version of the compression system of FIG. 1 described in the previously mentioned proposed standard prepared by the Joint Photographic Experts Group and currently under review by the International Standards Organisation. According to the transform technique of decorrelation, the signal is subjected to a linear transform (decorrelation) operation prior to quantisation and encoding. A disadvantage of the transform technique is that, although the whole image (for example, a whole field) should be transformed, this is impractical in view of the amount of data involved. The image (field) thus has to be divided into blocks (for example, of 8×8 samples representing respective pixels), each of which is transformed. That is, transform coding is complex and can be used on a block-by-block basis only.

A recently proposed approach to compression/coding in the frequency domain is that of sub-band coding. In this approach, the decorrelator 12 in the system of FIG. 1 would comprise a spatial (two-dimensional) sub-band filtering arrangement which divides the input video signal into a plurality of uncorrelated sub-bands each containing the spatial frequency content of the image in a respective one of a plurality of areas of a two-dimensional frequency plane of the image, the sub-bands then being selectively quantised by the quantiser 14 in accordance with their positions in the sensitivity spectrum of the human psychovisual system. That is, decorrelation is achieved in this case by putting the energy of the overall image into different sub-bands of the two-dimensional spatial frequency domain. Sub-band filtering is believed to provide better decorrelation than the transform approach. Also, unlike the transform technique, there is no restriction to operation on a block-by-block basis: the sub-band filtering can be applied directly to the video signal.

FIG. 2 illustrates a sub-band coding system in which the input video signal is passed through a low-pass decimation filter 22 and a high-pass decimation filter 24. The resulting two output signals represent different portions of the frequency spectrum of the input signal. The two signals are then quantised, sequenced and entropy encoded as discussed in relation to FIG. 1. The sub-band components of the input signal can now be transmitted or stored for later reproduction. The storage or transmission of the sub-band components is illustrated by the dashed line 26 in FIG. 2.

When the sub-band components are recovered from the recording medium they are passed through corresponding matching filters to regenerate the original frequency components. These matching filters are a low-pass interpolation filter 30 and a high-pass interpolation filter 28. The outputs of the interpolation filters 28, 30 are added by a summation circuit 32 to yield the original video input signal.

FIG. 2 illustrates the decomposition of the input video signal into two sub-bands. In practice, the input video signal would be decomposed into many more sub-band components. FIG. 3 illustrates the decomposition of an input signal into eight sub-band components and its subsequent recombination into an output video signal. The filters of the sub-band coding system comprise finite impulse response filters with appropriate delays and weighting coefficients to perform both horizontal and vertical frequency decomposition. Different forms of filter for performing sub-band frequency separation are known, e.g. some possible filters are described in the article entitled 'Exact Reconstruction Techniques for Tree Structured Sub-Band Coders', in IEEE Transactions on Acoustics, Speech and Signal Processing, Volume ASSP-34 at pages 434 to 441, June 1986.

Figure 4:
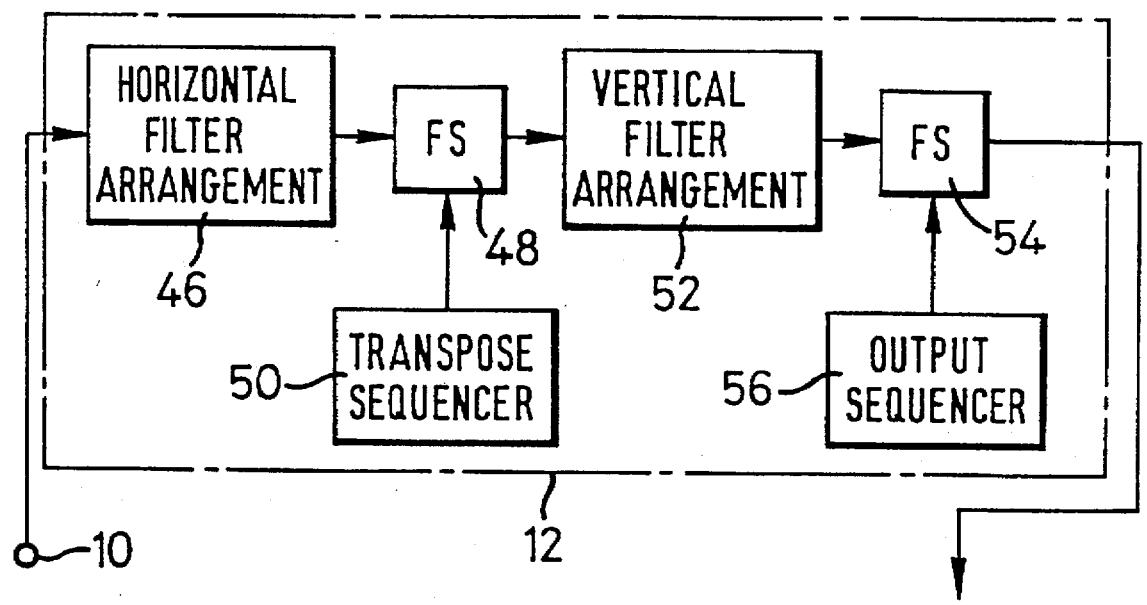
FIG. 4 illustrates a two-dimensional sub band decorrelator.

FIG. 4 illustrates the decorrelator 12 of FIG. 1 in more detail. The decorrelator comprises a horizontal filter arrangement 46, an intermediate field store 48, a transpose sequencer (address generator) 50, a vertical filter arrangement 52, an output field store 54 and an output sequencer (address generator) 56. Sub-band filtering is effected on a separable basis. Thus, in FIG. 4, filtering in the two orthogonal image directions, namely the horizontal direction (the direction of image scanning in the case of conventional video) and the vertical direction, is effected entirely independently and separately of one another by respective one-dimensional filtering operations performed in the horizontal and vertical filter arrangements 46 and 52, respectively.

The horizontal filter arrangement 46 and vertical filter arrangement 52 can be of substantially the same construction as one another. Thus, the construction of the horizontal filter arrangement 46 only will be described in detail. The filtering is to achieve 8 sub-bands in each of the horizontal and vertical directions, that is to say that a square array of 64 (8×8) sub-bands is to be produced. The 64 sub-bands are to be of equal extent to one another.

The horizontal filter arrangement 46 is preferably of a tree or hierarchical structure as shown in FIG. 3, comprising three successive filter stages. The first stage comprises a low pass filter (LF) and a high pass filter (HF), each of which is followed by a respective decimator (not shown). The LF filter, HF filter and the decimators together make up a quadrature mirror filter (QMF). Each of the filters can be a finite impulse response filter of conventional form. In use, a line of a field of the input digital video signal is applied, sample-by-sample, to the first stage, to be low pass filtered and high pass filtered by the LF and HF, respectively. Thus, the LF and HF produce outputs comprising low pass filtered and high pass filtered versions of the input line, respectively, the outputs representing the spatial frequency content of the line in the lower and upper halves of the horizontal spatial frequency range. That is, the first stage divides the input line into two sub-bands in the horizontal direction. The decimators decimate (sub-sample) the respective outputs by a factor of two, whereby the total number of samples outputted by the decimators (together) is the same as the total number of samples in the line.

The second stage is of similar construction to the first stage, except that there are two QMFs each as in the first stage and the output from each of the decimators of the first stage is passed as an input to a respective one of the two QMFs. Thus, the second stage produces four outputs representing the spatial frequency content of the line in four equal quarters of the horizontal spatial frequency range. That is, the second stage further divides the two sub-bands, into which the input line was divided in the first stage, into four sub-bands in the horizontal direction. The four decimators of the second stage decimate (sub-sample) the respective outputs by a factor of two, whereby the total number of samples outputted by the decimators of the second stage (together) is the same as the total number of samples in the line.

The third stage is of similar construction to the first stage, except that there are four QMFs each as in the first stage and the output from each of the four decimators of the second stage is passed as an input to a respective one of the four QMFs. Thus, the third stage produces eight outputs representing the spatial frequency content of the line in eight equal one-eighths of the horizontal spatial frequency range. That is, the third stage divides the four sub-bands into which the input line was previously divided into the required eight sub-bands in the horizontal direction. The eight decimators of the third stage decimate (sub-sample) the respective outputs by a factor of two, whereby the total number of samples outputted by the decimators of the third stage (together) is the same as the total number of samples in the line.

The eight outputs of the third stage, that is of the horizontal filter arrangement 46, are passed to the intermediate field store 48 and stored at positions corresponding to respective one-eighths of a first line thereof. The above process of horizontal filtering is then repeated for all the other lines of the field of the input digital video signal. This results in the intermediate field store 48 containing a version of the field of the input digital video signal that has been filtered into eight sub-bands in the horizontal direction (only). Each line of the field stored in the intermediate field store 48 is divided into eight portions each containing the horizontal spatial frequency information in a respective one of eight sub-bands of the horizontal spatial frequency range of the image that the original field represented. Thus, the horizontally filtered field stored in the intermediate field store 48 can be considered to be divided into eight columns.

The horizontally filtered field stored in the intermediate field store 48 is then fed (under the control of the transpose sequencer 50) into the vertical filter arrangement 52, in which it is filtered into eight sub-bands in the vertical direction in similar manner to that in which filtering into eight sub-bands in the horizontal direction was achieved in the horizontal filter arrangement 46. The horizontally and vertically filtered field is fed on a line-by-line basis into the output field store 54 to be passed from there to the quantiser 14. The store 54 can be considered to have been partitioned into an array of 64 (8×8) storage regions, in each of which a respective one of the 64 sub-bands is stored. Thus, successive fields of the input digital video signal are sub-band filtered and passed, duly filtered, to the quantiser 14 after a delay of two field intervals.

The transpose sequencer 50 produces read addresses for the intermediate field store 48, to control reading of the contents thereof into the vertical filter arrangement 52, as follows. As will be recalled, the signal as stored in the intermediate field store 48 comprises the lines of the original field, each divided horizontally into eight sub-bands. That is, the signal as stored in the intermediate field store 48 can, as mentioned above, be considered to comprise eight columns. To enable the signal stored in the intermediate field store 48 to be vertically filtered by hardware of the same construction (the vertical filter arrangement 52) used to horizontally filter it, it must be transposed, that is rotated through 90 degrees, as it is read to the vertical filter arrangement 52, so that it comprises eight rows (as opposed to columns). The transpose sequencer 50 addresses the intermediate field store 48 in such a manner as to accomplish this.

The nature of the filtering produced by the combination of the horizontal filter arrangement 46 and the vertical filter arrangement 52 is such that data stored in the output field store 54 is somewhat scrambled and reordered by the output sequencer 56 before being passed to the rest of the apparatus for processing.

Figure 5:
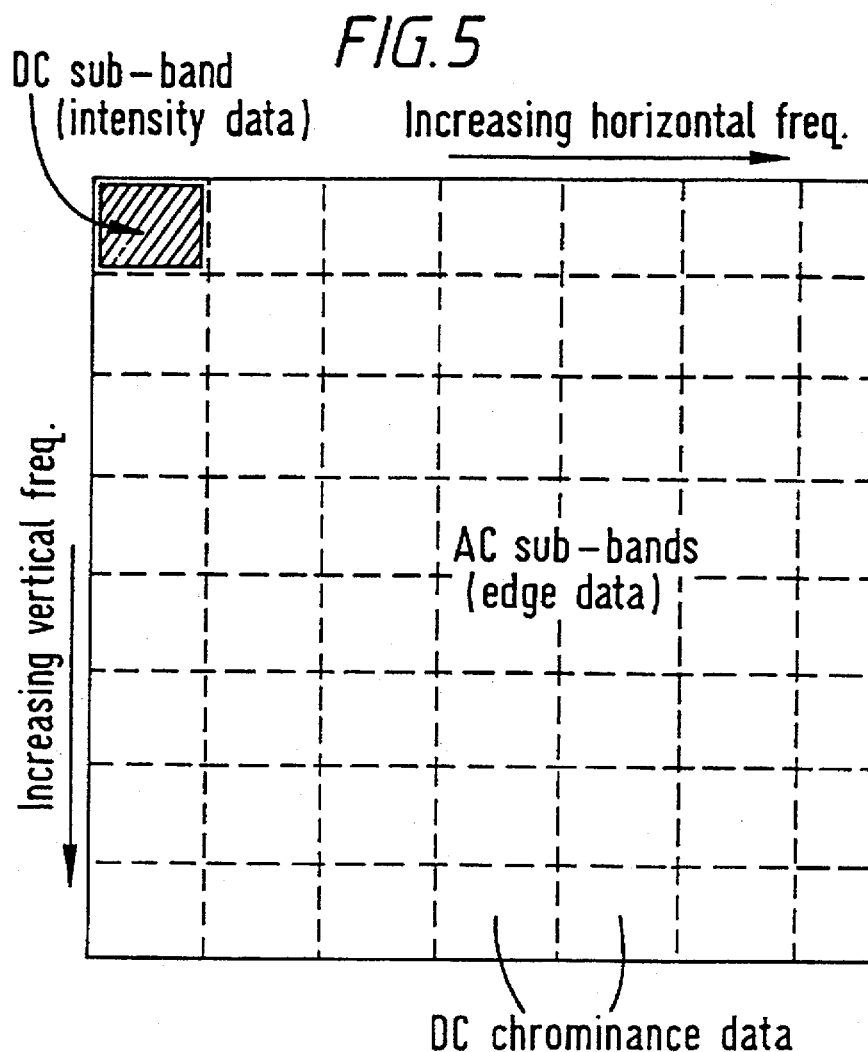
FIG. 5 illustrates a frequency separated video signal.

FIG. 5 illustrates the various sub-band components produced if the input video signal is decomposed both horizontally and vertically into eight frequency components (this can be considered to be the data stored in the output field store 54 after it has had the reordering of the output sequencer 56 applied to it). Each of these sub bands or sub-pictures is represented by one of the blocks in FIG. 5. The upper left hand block represents the dc sub-band. This is the band of lowest horizontal and vertical frequency although in practice it doesn't necessarily represent only the constant portions of the signal with strictly zero frequency. This dc sub-band will contain the majority of the dc luminance information of the original input video signal. The relative importance of the remaining sub-bands to the eventual perception of the picture by a viewer varies. Generally speaking, the higher frequency sub-bands are less important to the eventual perception of a viewer. In relation to FIG. 5, the frequency which a particular sub-band component represents increases in moving downward and/or rightward in the array of blocks. Further bands of particular importance are those that contain any dc chrominance information. In the case of NTSC format signals the two lower central blocks contain this information.

Figure 6:
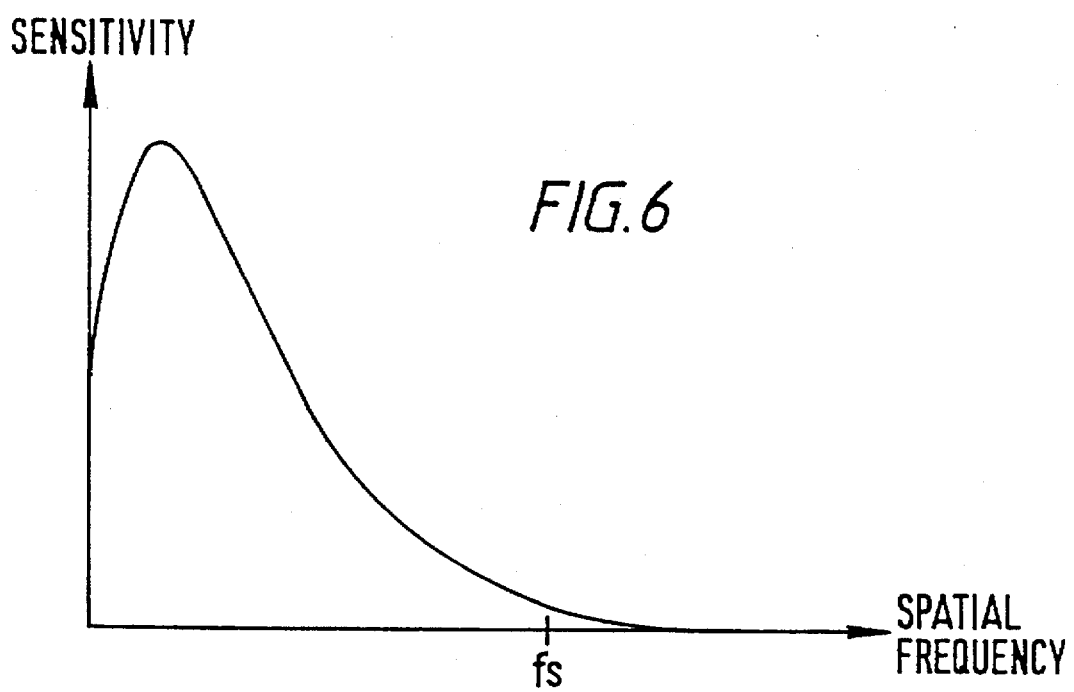
FIG. 6 illustrates the human psychovisual response to images of differing spatial frequency.

FIG. 6 illustrates the human psychovisual response to image components of differing spatial frequency. As can be seen, the level of human perception first rises and then steadily diminishes with increasing spatial frequency. This characteristic can be exploited in a data compression system with the realisation that components of higher spatial frequency can be subjected to higher degrees of quantisation with subsequent loss in information, without significantly degrading the perceived image that can be reconstructed.

FIG. 7 shows a quantisation matrix that can be applied to the differing sub bands of FIG. 5 by the quantiser 14 of FIG. 1. The way in which the quantiser operates is that each value within each sub band block is divided by a corresponding quantisation value and then the integer value of the result is taken. The quantisation value is the product of the entry in the quantisation matrix and a quantisation scaling factor ($Q_s$) that will be discussed in more detail below. For the moment it is assumed that $Q_s=1$. Thus, if a value of 30 was read from the dc luminance sub band in the top left hand corner, this would be divided by the corresponding quantisation value of 68 and the integer value taken giving a quantised result of zero. Similarly, if a value of 80 were read from the dc luminance sub band and divided by 68, the resulting integer value would be one.

It will be seen that the lowest quantisation values occur in the bands below and to the right of the dc luminance sub band. This is because the human visual system is most responsive to these sub bands. The values for the quantisation matrix can be determined by a process of trial and error with subjective viewing tests to see which values gives the best perceived image. Alternatively, values can be derived by extending the curve of FIG. 6 into three dimensional form to produce a curved surface. The surface is the locus of the curve of FIG. 6 rotated through 90° about the sensitivity axis. The sub band frequency blocks lie in different regions of the spatial frequency plane beneath this surface, and by integrating under the surface to find the volume between each frequency block and the surface then a relative quantisation value can be determined.

It will be noted that the sub band frequency components which contain the dc chrominance information are subjected to much less severe quantisation than would be the case if they did not contain this dc chrominance information. It is important to the reconstructed image quality that the dc chrominance information should not be too severely quantised.

FIG. 8 shows the scanning pattern imposed by the data sequencer 18 of FIG. 1. The dc luminance information and dc chrominance information sub bands are intra-sub band scanned and fed to the entropy encoder 20 of FIG. 1. The data from the remaining sub bands is inter-sub band scanned out to the entropy encoder 20 in the order shown in FIG. 8, i.e. in order of increasing ac spatial frequency FIG. 9 illustrates a data compression apparatus and a data decompression apparatus operating with inter-block dynamic control of the degree of quantisation. The input image data is passed through the decorrelator 12, the quantiser 14, the data sequencer 18 and the entropy encoder 20 within the data compression apparatus as described previously. The entropy encoder 20 coupled to a field store 60 which stores the compressed data prior to its final formatting by the entropy encoder 20 and output from the system.

The data within the field store 60 resulting from the a complete set of sixty four sub bands is deemed to comprise one block of compressed data with a predetermined maximum size. These blocks of compressed data may then be recorded as individual tracks on a magnetic tape for subsequent recovery and decompression, or could be stored within the RAM recorder for subsequent real-time recovery, decompression and broadcast transmission. It will be understood that the blocks of compressed data could also be handled in many other different manners before decompression.

As mentioned earlier in relation to FIG. 7, the degree of quantisation applied to each sub band varies under control of the quantisation matrix. The overall degree of quantisation of the entire block of compressed data (i.e. the collection of 64 sub bands) is varied in dependence upon the quantisation scale factor ($Q_s$). Each data value being quantised is divided by both the appropriate value from the quantisation matrix and the value of $Q_s$. If $Q_s$ is high, then the overall degree of quantisation is increased, the degree of compression is increased and the resulting block of compressed data will be smaller. If $Q_s$ is low, then the overall degree of quantisation is decreased, the degree of compression is decreased and the resulting block of compressed data will be larger.

A compressed bit counter 62 counts the number of bits fed to the field store 60, i.e. the compressed bit counter 62 measures the size of the block of compressed data resulting from the sixty four sub bands. At the end of compression of each block of input data (i.e. a complete image), the value stored within the compressed bit counter 62 is fed to a PROM 64 together with the value of $Q_s$ applied to the block of input data that has just been processed. The value of $Q_s$ is stored within $Q_s$ latch 66. The PROM 64 calculates a new value of $Q_s$ in dependence upon the value from the compressed bit counter 62 and the current value of $Q_s$ as will be discussed in more detail below. The new value of $Q_s$ calculated is intended to be such as to control the size of the block of compressed data within the field store 60 to be equal to the predetermined maximum size allowed for the compressed data for one image.

The new value of $Q_s$ calculated by the PROM 64 is then used to update the $Q_s$ latch 66 which holds the new value throughout the compression of the subsequent block of input data. The value of $Q_s$ held within the $Q_s$ latch 66 is fed to the quantiser 14 where it controls the overall degree of quantisation.

It will be appreciated that when decompressing a block of compressed data that has had a variable degree of quantisation applied to it, the decompression apparatus should know what degree of quantisation was in fact applied to that block of data. To this end, the value stored within the $Q_s$ latch 66 is supplied as header data for the block of compressed data stored within the field store 60. The header insert unit 67 prefixes this header data to the compressed block of data. This enables a decompression apparatus to read from the header data what quantisation scaling factor was applied to each block of compressed data. The PROM 64 and the $Q_s$ latch 66 in combination can be thought of as an inter-block quantisation controller 68.

The output from the compressed bit counter 62 is also continuously fed to an overflow detector 70. The overflow detector 70 compares the instantaneous compressed bit count with the maximum predetermined size of the block of compressed data being compiled and outputs an overflow indicator when the predetermined maximum size has been exceeded. The overflow indicator triggers the entropy encoder 20 to generate a code not normally produced for compressed data, so that the overflow indicator will not be confused with genuine compressed data. An appropriate code can be chosen by reference to the entropy encoder code table.

The decompression apparatus comprises an entropy decoder 72 and field store 82, a data resequencer 74, a dequantiser 76 and an interpolator 78. The compressed data from the data compression apparatus is transferred to the data decompression apparatus via one of the mechanisms previously described and then passed through a header reader 80 prior to undergoing reformatting by the entropy decoder 72 and storage in a field store 82. The header reader 80 reads the value of $Q_s$ put into the header data of the compressed block and stores this within $Q_s$ latch 84. The compressed data itself then streams through the header reader 80 through the entropy decoder 72 into the field store 82.

If entropy decoder 72 detects the occurrence of an overflow indicator code within the data stream it recognises that an overflow occurred when that data was compressed and sets all the output data values not determinable from the compressed data to a predetermined value within the field store 82, e.g. sets all the undeterminable values to zero.

The $Q_s$ latch 84 supplies the value of $Q_s$ to the dequantiser 76 during dequantisation of each block of compressed data. Accordingly, each block of compressed data has a degree of dequantisation applied to it that matches the degree of quantisation applied during compression.

The operation of the entropy decoder 72, the data resequencer 74 and the interpolator 78 are complimentary to the operation of the entropy encoder 20, the data sequencer 18 and the decorrelator 12. The dequantiser 76 multiplies each compressed data value by the appropriate value from the quantisation matrix and the value of $Q_s$ from the $Q_s$ latch 84, to effect the complementary action to that carried out by the quantiser 14. The header reader 80 and the $Q_s$ latch 84 together comprise an inter-block dequantisation controller 85.

Figure 10:
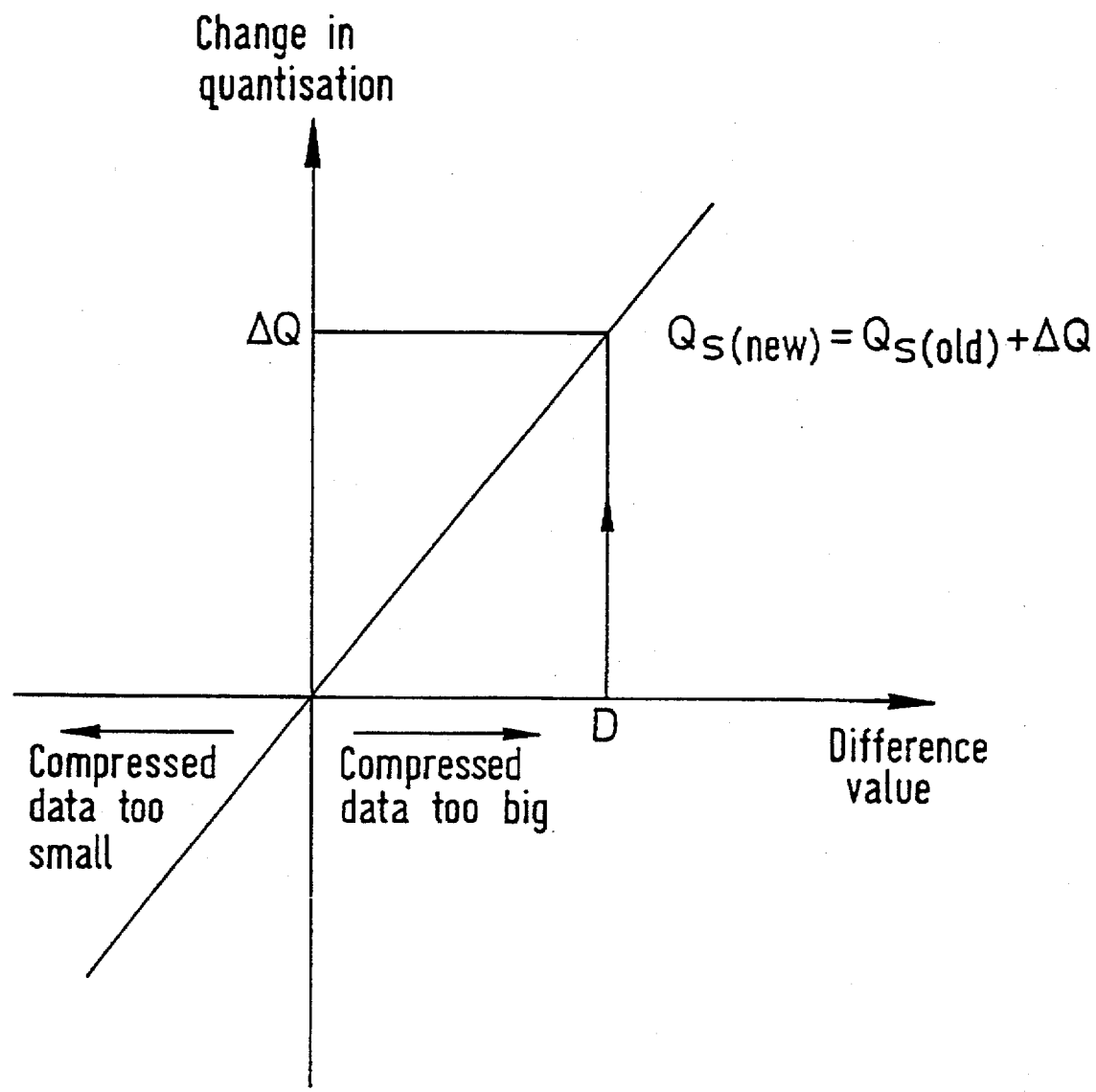
FIG. 10 illustrates a first technique for determining the changes in quantisation between blocks.

FIG. 10 illustrates one technique whereby the PROM 64 determines what change in $Q_s$ to make between different blocks of input data. The PROM 64 reads the output from the compressed bit counter 62 and subtracts from this the known predetermined maximum size of the block of compressed data. This yields a difference value D. The PROM 64 then refers to a look-up table in which data representing the graph of FIG. 10 is stored. A change in quantisation appropriate to the measured difference value D is read from this look-up table. If the difference value is positive, then the block of compressed data is too large and a positive value is added the current value $Q_s$ to produce a new value of Qfor use on the next block of data. A larger value of $Q_s$ gives more compression. If the difference value is negative, then the block of compressed data is too small and a negative value is added to the current value of $Q_s$. The new value of $Q_s$ is then fed to the $Q_s$ latch 66.

This technique copes with both overruns and underruns in compressed block size. If the quantisation applied has been too severe then the compressed block will be too small and the PROM 64 will cause an decrease in the value of $Q_s$. If the quantisation has not been severe enough, then the compressed block will be too large and the PROM 64 will cause an increase in the value of $Q_s$. In this way, the size of the compressed blocks is held to be substantially equal to the predetermined maximum size. This helps to ensure that overruns do not occur, whilst not applying too severe a degree of quantisation.

Figures 11A, 11B:
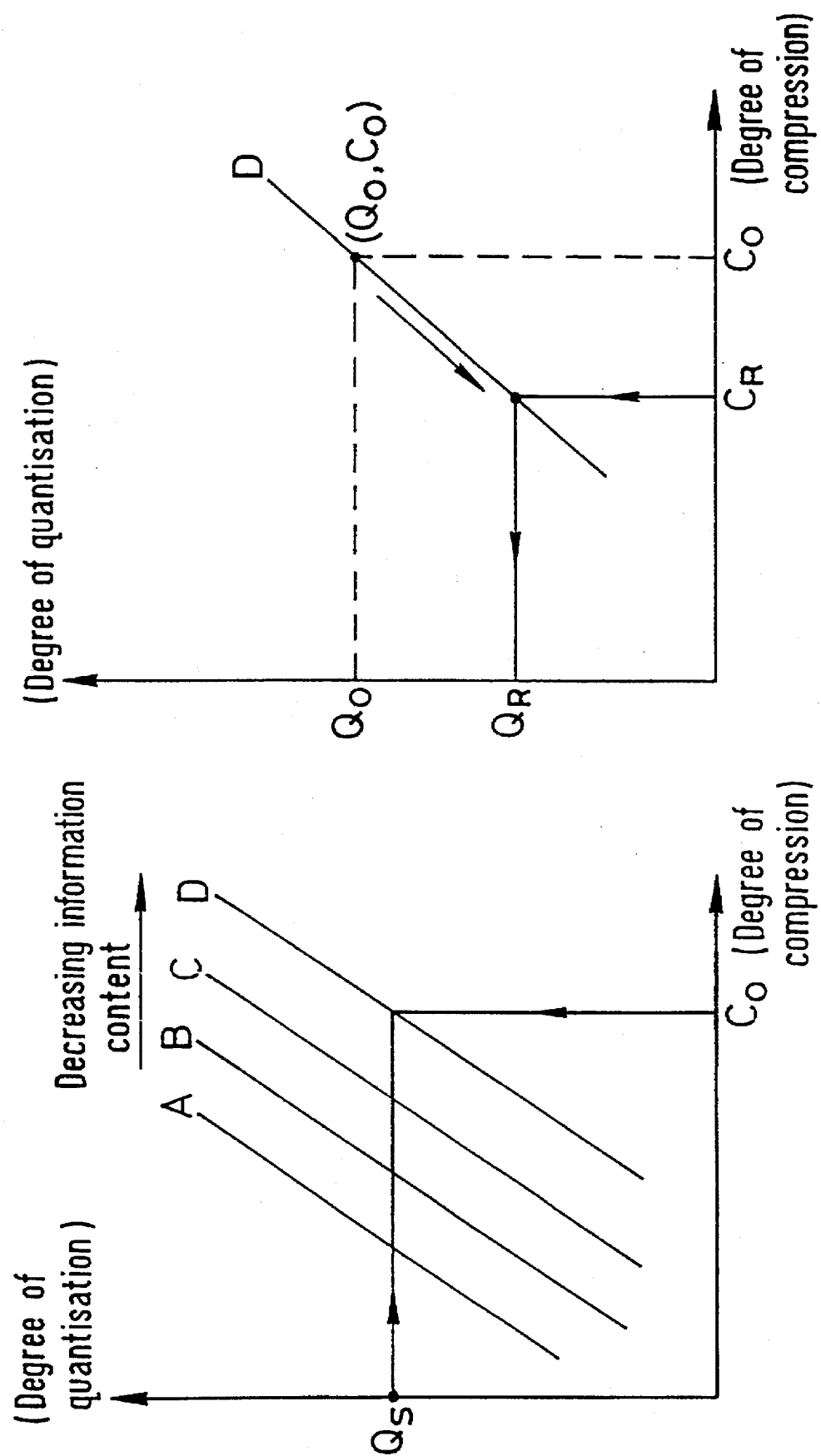
FIG. 11 illustrates a second technique for determining the changes in quantisation between blocks.

FIG. 11 illustrates an alternative technique whereby the PROM 64 can calculate the value of $Q_s$ for the next block of data. At the end of compression of each block of data the compressed bit counter 62 is read and a degree of compression for that block of data established. The value of $Q_s$ that produced that degree of compression is also read from the $Q_s$ latch 66. The PROM 64 stores data defining a number of curves A B C and D representing the relationship between the degree of quantisation and the degree of compression achieved for images of varying degrees of complexity.

The PROM 64 uses the read value of $Q_s$ and the established achieved degree of compression to identify which curve should be used. In this way, the PROM 64 has effectively established the relative information content of the block of input data being compressed so that it can apply the appropriate relationship between degree of quantisation and degree of compression for that relative information content.

Having established what the appropriate curve is, the degree of quantisation that will produce the required degree of compression can be read from the curve. In the case illustrated there has been a change from relatively high information content to relatively low information content in the image being displayed. Such a change could commonly occur at an edit scene change within a sequence of images. The result of this change is that for the first block of data following the change too high a degree of quantisation was applied resulting in an unnecessarily high degree of compression. At the end of compression of the first image following the scene change the relative information content of the new image can be established and the appropriate curve determined. The degree of quantisation required to produce the necessary compression ratio can then be read from the curve and fed to the $Q_s$ latch 66.

FIG. 12 shows an alternative compression apparatus effecting inter-block dynamic control of the degree of quantisation. The inter-block quantisation controller 68 performs a test compression of the block of input data in question to determine what degree of compression will be achieved with the current value of $Q_s$. Having determined this a corrected value of $Q_s$ can be generated and applied to the same block of input data to produce the block of compressed data that will enter the output data stream of the data compression apparatus.

The output from the decorrelator 12 is fed to a test quantiser 90 that applies a test degree of quantisation based upon the $Q_s$ value for the previous block of data. The test quantiser 90 operates in the same way as the quantiser 14 described in relation to FIG. 9. Similarly, the test data sequencer 92 and the test entropy encoder 94 operate in the same way as the data sequencer 18 and the entropy encoder 20 from FIG. 9 so as to produce a genuine measurement of the degree of compression that will be achieved as indicated by the compressed bit counter 96. At the end of the test compression the output from the compressed bit counter is fed to the PROM 98 where one of the techniques as described in relation to FIG. 10 or FIG. 11 is carried out.

The PROM 98 outputs a corrected value of $Q_s$ to the previous $Q_s$ latch 100 for use in the next test compression and to $Q_s$ latch 102 for use in compression in the current block of data. The output from $Q_s$ latch 102 is fed to quantiser 14 where it controls the overall degree of quantisation. Whilst the data from the decorrelator 12 was undergoing test compression within the inter-block quantisation controller 68 it was also being processed by the delay circuit 104 which has the effect of delaying the arrival of that block of data at the quantiser 14 until the corrected value of $Q_s$ has been stored within the $Q_s$ latch 102. In this way, a corrected value of $Q_s$ can be applied to the same block of data upon which its correction was based.

In contrast to the system of FIG. 9, the result of this is that even for the first image following a scene change an attempt to arrive at the correct value of $Q_s$ is made.

As previously described, overflow detection can be carried out by an overflow detector 106 operating in combination with a compressed bit counter 108 to insert overflow indicators within the data stream where appropriate. The output from the $Q_s$ latch 102 is also supplied to form header data for each block of compressed data so that the subsequent decompression can be carried out with knowledge of the degree of quantisation applied.

The decompression apparatus operative with the embodiment of FIG. 12 may be the same as that illustrated in FIG. 9.

Figure 13B:
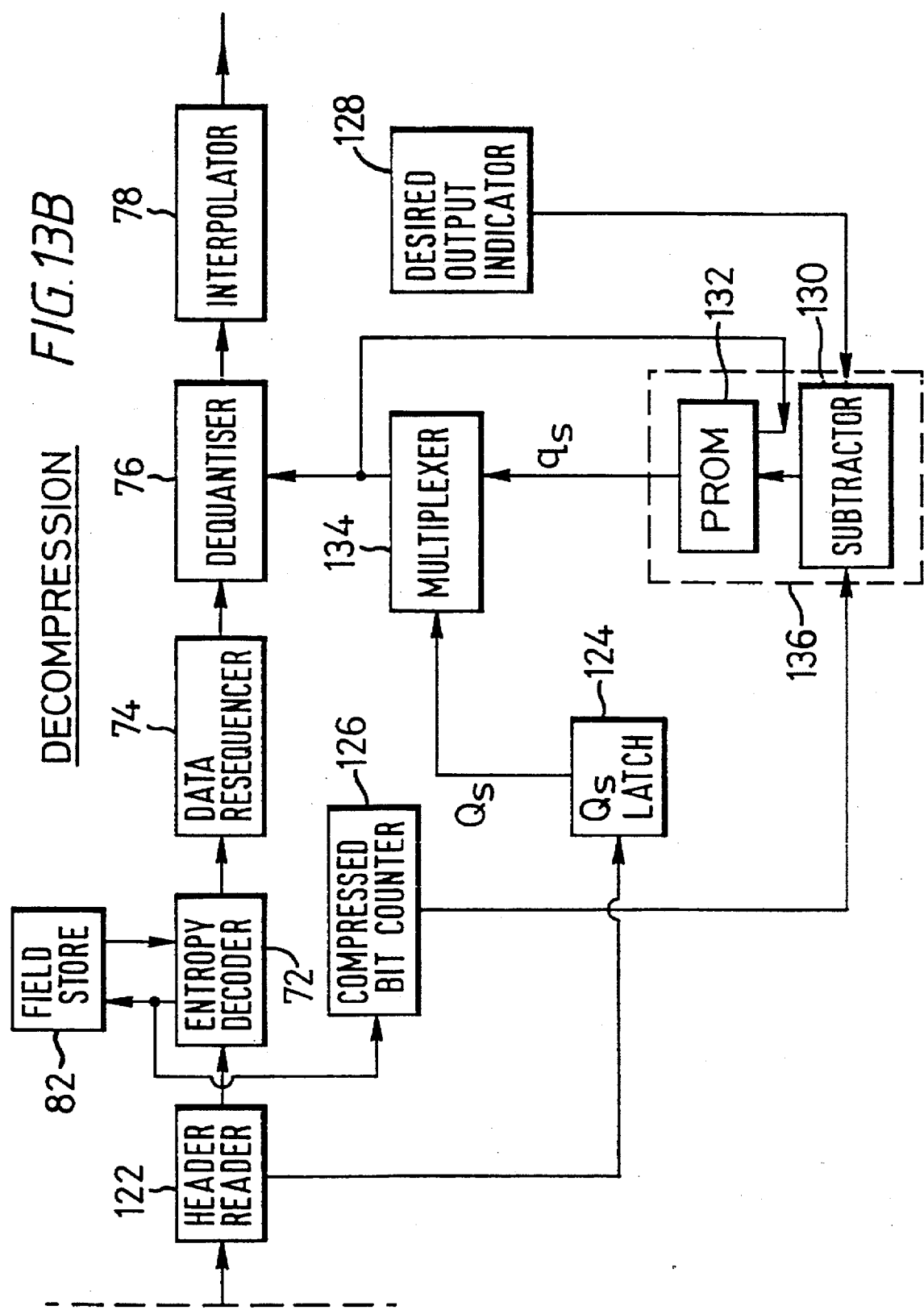

FIG. 13 illustrates a compression apparatus and a decompression apparatus effecting both intra-block and inter-block control of the degree of quantisation. The basic flow of data is through the decorrelator 12, quantiser 14, the data sequencer 18 to the entropy encoder 20 and the field store 60, and subsequently to the entropy decoder 72 and the field store 82 to the data resequencer 74, the dequantiser 76 and the interpolator 78.

A desired occupancy indicator 110 generates a linearly increasing value modelling what should be the correct average filling rate of the field store 60. The outputs of the desired occupancy indicator 110 and the compressed bit counter 62 are continuously fed to a subtracter 112 throughout the compression of each block of data. The subtracter 112 produces an output equal to the value of the compressed bit counter 62 minus the output of the desired occupancy indicator 110. During the compression, the subtracter 112 indicates whether, for the data processed so far, the required degree of compression has been achieved. If the output from the subtracter 112 is positive the compressed data is too big.

The output from the subtracter 112 is fed to a PROM 114. The PROM determines what correction should be applied within the current block of data to the value of $Q_s$ to result in a final compressed block of a size substantially equal to the predetermined maximum size. The PROM 114 includes a look-up table mapping error against correction value. The PROM 114 is also fed with the current value of $Q_s$ from which the appropriate value for the rest of the block of data can be determined.

The output from the PROM 114 is also fed to an averaging unit 116 which accumulates a value equal to the average quantisation value applied over that block of data. The header insert unit 67 reads the averaging unit 116 to determine what value it should write within the header data.

The outputs from the PROM 114 and the averaging unit 116 pass through multiplexer 118 to the quantiser 14. The multiplexer selects the value accumulated in the averaging 116 for the start of compression of each block and then passes control to the output from the PROM 114.

It will be seen that the quantiser 14 applies a degree of quantisation that not only dynamically varies between blocks of data, but dynamically varies within blocks of data.

Within the corresponding decompression apparatus, the header reader 122 recovers the average $Q_s$ value for the block of data being decompressed and passes this to a $Q_s$ latch 124 for storage. The compressed bit counter 126 counts the bits input to the field store 82. A desired output indicator 128 produces an output modelling the linear increase in the count of bits output from the dequantiser 76 that should ideally occur. The values output from the compressed bit counter 126 and the desired output indicator 128 are continuously fed to a subtracter 130 throughout decompression of each block of data.

The subtracter 130 uses these inputs to determine if the required degree of dequantisation necessary to produce an output block of data having the appropriate size is currently being applied. As before, this can be determined by subtracting the values. An error value thus generated together with the current quantisation value is used to produce corrected value $q_r$. The multiplexer 134 selects the latched value for the start of the block and the output from the PROM 132 for the remainder.

The deviations in the achieved degree of compression from the desired degree of compression that occurred within the data compression apparatus will be mirrored in the decompression apparatus. Accordingly, the quantisation value use to compress the data can be regenerated on an intra-block basis duping decompression. In this way, the degree of dequantisation applied by the dequantiser 76 is able to track the intra-block variation in the degree of quantisation applied by the quantiser 14.

Figure 14:
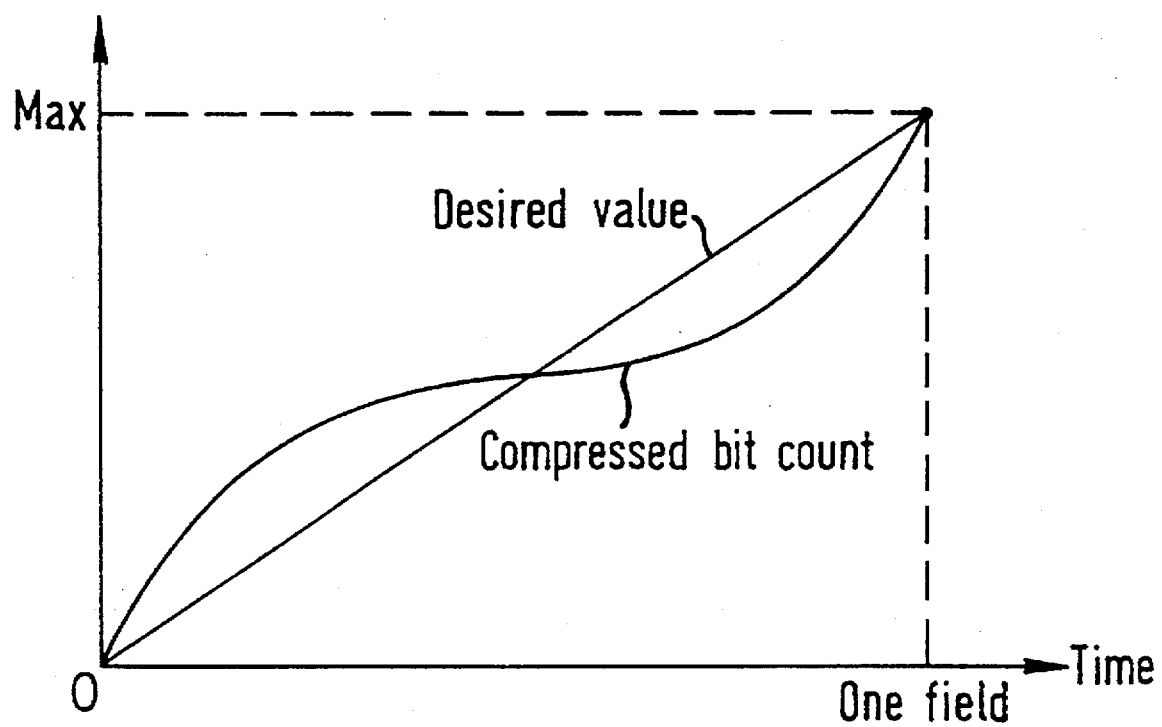
FIG. 14 illustrates the operation of the intra-block control technique within the data compression and decompression apparatus.

The operation of the intra-block technique within the compression apparatus and the decompression apparatus is illustrated by FIG. 14. In FIG. 14, it can be seen that desired value increases at a constant rate. Although the input bit rate is constant, the input information rate will not necessarily also be constant. Thus, if during the first part of a block of input data there is a particularly high information content, then compression will be less effective and the rate of increase in the compressed bit count will be higher than the target. This is illustrated by the deviation of the compressed bit count above the target dashed line during the initial part of the compression.

Conversely, if during the second part of a block of input data the information content is peculiarly low, then the compression will be more effective than expected and the compressed bit rate will fall below the target value. Both the above deviations from the target value are corrected by the intra-block quantisation controller 134 through generation of an appropriate correction value.

FIG. 14 also illustrates the variation in the output of the desired output indicator 128 and compressed bit counter 126. As the first part of the block was particularly information dense, the degree of compression achieved was below target and the corresponding rate of increase in the compressed bit count will be higher than expected. Conversely, in the later portion of the block, the information content was peculiarly low and a large number of output bits will be generated for a correspondingly smaller number of compressed bits. In this way, the compressed bit count rate decreases below the target value. Once more, both these deviations are corrected by generation of an appropriate correction value within the intra-block dequantisation controller 136.

The desired values and the compressed bit counts on both the encoding and decoding sides of the system of FIG. 14 track one another. At the same point through a block during either compression or decompression identical values will be present in the desired values and compressed bit counts. If the PROMs on each side contain the same maps, then since they are fed with the same inputs they will produce the same quantisation factor. In this way the system applies exactly the same scale factor duping dequantisation as were used to compress those bits duping quantisation.

Although illustrative embodiments of the invention have been described in detail herein with reference to the accompanying drawings, it is to be understood that the invention is not limited to those precise embodiments, and that various changes and modifications can be effected therein by one skilled in the apt without departing from the scope and spirit of the invention as defined by the appended claims.

We claim:

1. A data compression apparatus, comprising:
   means for indicating for each particular value in a current block of input data a desired number of bits of compressed data which should be used to represent values preceding said each particular value in said current block of input data;
   means for generating respective current value quantising numbers for each of the values in said current block of input data as a function of the respective desired number of bits of compressed data for the preceding values in said current block of input data and of the respective preceding value quantising numbers generated for preceding values in said current block of input data; and
   a quantiser for quantising values in said current block of input data using said respective current value quantising numbers to produce a block of compressed data having a size substantially equal to a predetermined maximum size.

2. A data compression apparatus as claimed in claim 1, further comprising:
   compressed bit counter means for producing for each particular value in a current block of input data a count of a number of bits of compressed data representing values preceding said each particular value in said current block of input data; and
   means for comparing said desired number of bits of compressed data and said count of said number of bits of compressed data to generate a difference; and
   wherein said means for generating said current value quantising numbers responds to said difference.

3. A data compression apparatus as claimed in claim 2, wherein said means for generating said current value quantising numbers includes memory means for storing errors and for reading out corresponding correction values, means for applying said difference between said desired number of bits of compressed data and said count of said number of bits of compressed data to said memory means as an error, and means for combining the correction value corresponding to said difference with one of said preceding value quantising numbers to generate one of said current value quantising numbers.

4. A data compression apparatus as claimed in claim 1, further comprising means for storing an average value indicative of an average degree of quantisation applied to a preceding block of input data, and means for selecting said average value as said preceding value quantising number for a first value of input data in said current block.

5. A data compression method, comprising the steps of:
   receiving a current block of input data;
   indicating for each particular value in said current block of input data a desired number of bits of compressed data which should be used to represent values preceding said each particular value in said current block of input data;

generating respective current value quantising numbers for each of the values in said current block of input data as a function of the respective desired number of bits of compressed data for the preceding values in said current block of input data and of the respective preceding value quantising numbers generated for preceding values in said current block of input data; and quantising values in said current block of input data using said respective current value quantising numbers to produce a block of compressed data having a size substantially equal to a predetermined maximum size.

6. A data compression method as claimed in claim 5, further comprising the steps of:

producing for each particular value in a current block of input data a count of a number of bits of compressed data representing values preceding said each particular value in said current block of input data; and comparing said desired number of bits of compressed data and said count of said number of bits of compressed data to generate a difference; and wherein the step of generating said current value quantising numbers is responsive to said difference.

7. A data decompression apparatus, comprising:

means for reading an average quantising indicator present in a received block of compressed data;

bit counter means for storing a count of a number of bits in said block of compressed data;

means for providing an indication of a desired number of bits of data which should be dequantised from said block of compressed data; and means for dequantising values in said block of compressed data as a function of said average quantising indicator, said count of said number of bits in said block of compressed data and said desired number of bits to produce a block of output data.

* * * * *